United States Patent
Hohmann et al.

[19]

[11] Patent Number: 5,803,436
[45] Date of Patent: Sep. 8, 1998

[54] HYDRAULIC TENSIONING DEVICE FOR THREADED BOLT

[76] Inventors: Frank Hohmann, Beethovenstrasse 9; Jörg Hohmann, Hubertusweg 11, both of D-59581 Warstein, Germany

[21] Appl. No.: 666,401
[22] PCT Filed: Dec. 7, 1994
[86] PCT No.: PCT/EP94/04072
   § 371 Date: Aug. 2, 1996
   § 102(e) Date: Aug. 2, 1996
[87] PCT Pub. No.: WO95/15835
   PCT Pub. Date: Jun. 15, 1995

[30] Foreign Application Priority Data

Dec. 8, 1993 [DE] Germany ................... 43 41 707.8

[51] Int. Cl.$^6$ ................................................. E21B 19/00
[52] U.S. Cl. ................................................. 254/29 A
[58] Field of Search .................... 254/29 A; 29/452; 81/57.38

[56] References Cited

U.S. PATENT DOCUMENTS 3,722,332   3/1973   Jones .
4,020,720   5/1977   Fujii .
4,175,453  11/1979   Exner et al. ........................... 254/29 A
4,438,901   3/1984   Reneau et al. ........................ 254/29 A
4,708,036  11/1987   Vossbrinck ........................... 254/29 A

FOREIGN PATENT DOCUMENTS 875426   7/1949   Germany .
1276565   4/1962   Germany .
3711544  10/1987   Germany .
9316464   3/1994   Germany .

*Primary Examiner*—Robert C. Watson
*Attorney, Agent, or Firm*—Robert W. Becker & Associates

[57] ABSTRACT

A hydraulic tensioning device for a threaded bolt has a cylinder resting on a machine part to be clamped with a threaded bolt and a nut. It further has a threaded bushing threaded onto a free end of the threaded bolt. A piston is guided sealingly in the cylinder and rests on the threaded bushing. A safety catch is connected to the cylinder or the piston and engages either the nut or the threaded bushing.

20 Claims, 6 Drawing Sheets

HYDRAULIC TENSIONING DEVICE FOR THREADED BOLT

BACKGROUND OF THE INVENTION

The invention relates to a tensioning device for threaded bolts with a cylinder resting on a machine part to be clamped by a threaded bolt and a nut, with a piston sealingly guided therein and supported with a threaded bushing, threaded onto a threaded end of the threaded bolt, and with a safety catch.

Known hydraulic tensioning devices for threaded bolts are comprised of a cylinder resting on the machine part to be clamped with a threaded bolt and a nut, in which a piston is sealingly guided. This piston rests on a threaded bushing that is threaded onto the threaded end of the bolt. In order to stretch the bolt, hydraulic oil is introduced under high pressure into the space between the piston and the cylinder so that the piston is displaced and entrains the threaded bushing threaded onto the threaded end of the threaded bolt. As a function of the pressure and the piston surface area as well as the diameter of the threaded bolt, a tensioning of the threaded bolt takes place and a nut threaded between the machine part and the threaded bushing can be tightened from the exterior without torsional moment until it abuts the machine part. This can be achieved either by turning a bushing, having a hexagon socket and being placed onto the nut from the exterior via a gear wheel engaging via an opening in the cylinder or by turning the nut with a pin inserted through an opening in the cylinder.

These known hydraulic tensioning devices for threaded bolts have been proven successful in practice and can be designed for one-step or multi-step operation for applying forces required for achieving a predetermined stretching of the threaded bolts of any conventional size.

Such known hydraulic tensioning devices for threaded bolts, as known from German Gebrauchsmusterschrift 76 00 965.9, have a safety means against overloading of the threaded bolt which is comprised of a limiter ring for limiting the stroke of the piston such that the threaded bolt upon contacting of the piston at the limiter ring is not subjected to further pulling force increase so that breakage of the bolt due to overextension can be avoided.

However, in hydraulic tensioning devices for threaded bolts of this kind the threaded bushing is a greatly loaded part which after a certain number of elongations of the threaded bolt may break within the area of the threaded end of the bolt. Since in such a case the entire system is suddenly released, the broken-off part of the threaded bushing, together with the piston and the cylinder, can be thrown with considerable energy and can cause considerable damage to neighboring machine parts as well as injuries to the operator.

In the aforementioned known hydraulic tensioning device for threaded bolts a safety means against throwing of parts of the hydraulic tensioning devices for threaded bolts upon breaking of the threaded bushing is not provided.

In contrast, a hydraulic tensioning device for threaded bolts according to the German Patent 1 297 557 provides a means for protecting the surroundings of a hydraulic device which means is placed over one end of the screw, for example, the screw for a steam turbine housing or coupling, for stretching the screw in the axial direction. The means is comprised of a protective device in the form of a protective plate supported by securing supports and is positioned on the hydraulic device in the vicinity of the tensioning device for the threaded bolts and fastened thereto.

This protective device is a catch basket that engages over the hydraulic tensioning device for threaded bolts and is fastened to a threaded bolt adjacent to the threaded bolt to be stretched. This known protective device is thus very cumbersome in its manipulation and requires a considerable amount of space.

It is an object of the invention to improve a hydraulic tensioning device for threaded bolts of the aforementioned kind such that upon breaking of the threaded bushing a safe catching of the broken-off part as well as of entrained parts of the tensioning device of the threaded bolt is ensured.

SUMMARY OF THE INVENTION

Based on this object, a hydraulic tensioning device for threaded bolts of the aforementioned kind is suggested in which inventively the safety catch for the broken-off part of the threaded bushing as well as for the entrained parts of the tensioning device for the threaded bolts is connected to the cylinder or the piston and cooperates with the threaded bushing or the nut.

The hydraulic tensioning device for a threaded bolt according to the present invention is primarily characterized by:

- a cylinder resting on a machine part to be clamped with a threaded bolt and a nut;
- a threaded bushing threaded onto a free end of the threaded bolt;
- a piston guided sealingly in the cylinder and resting on the threaded bushing;
- a safety catch connected to the cylinder and engaging one of the nut and the threaded bushing.

Preferably, the safety catch is at least one radially inwardly extending projection. The threaded bushing has an end face facing the machine part and the projection engages the end face of the threaded bushing.

Expediently, the projection is a first circumferential conical surface and the end face has a second circumferential conical surface matching the first circumferential conical surface.

Advantageously, the projection is a radial collar.

The cylinder preferably has at least one transverse bore and the safety catch is comprised of at least one pin received in the at least one transverse bore.

In a further embodiment of the present invention, at least one pin engages an end face of the threaded bushing facing the machine part.

The end face comprises a conical surface and the at least one pin has a flattened surface matching the conical surface.

The nut has a catch projection and the at least one pin engages the catch projection. The catch projection preferably is an annular groove.

The cylinder has two of the transverse bores and two of the pins, wherein the pins extend parallel to one another on opposite sides of the threaded bolt.

The safety catch advantageously comprises a connecting bar connecting the two pins to a U-shaped bracket.

The safety catch is at least one radially inwardly extending projection. The nut includes a washer resting on the machine part and having at least one catch projection. The at least one radially inwardly extending projection engages the catch projection.

Two of the radially inwardly extending projections and two of the catch projection are provided, and the radially inwardly extending projections and the catch projections form a bayonet closure.

The at least one radially inwardly extending projection and the at least one catch projection have conical contact surfaces for engaging one another.

The safety catch is at least one annular segment having two radially extending projections, wherein the cylinder has a first annular groove engaged by a first one of the radially inwardly extending projections and wherein the nut includes a washer resting on the machine part and having a second annular groove engaged by a second on of the radially inwardly extending projections.

The cylinder rests on the washer and two of the ring segments are connected by a hinge and surround the cylinder and the washer.

Pursuant to another embodiment of the present invention, the hydraulic tensioning device for a threaded bolt is primarily characterized in:

a cylinder resting on a machine part to be clamped with a threaded bolt and a nut;

a threaded bushing threaded onto a free end of the threaded bolt;

a piston guided sealingly in the cylinder and resting on the threaded bushing;

a safety catch connected to the piston and engaging the threaded bushing.

Preferably, the safety catch is at least one radially inwardly extending projection;

the threaded bushing has an end face facing the machine part; and the projection engages the end face of the threaded bushing.

The projection is a first circumferential conical surface and the end face has a second circumferential conical surface matching the first circumferential conical surface. The projection preferably is in the form of a radial collar.

The invention is based on the premise that the threaded bushing usually breaks at the outermost end of the threaded part extending past the nut so that a part of the threaded bushing as well as of the nut remains threaded onto the threaded end. This part of the threaded bushing or of the nut remaining on the threaded end is now used in order to catch the thrown part such that the safety catch at the cylinder or the piston rests at the end of the threaded bushing facing the machine part, at the nut or at a washer positioned underneath the nut.

The safety catch may be at least one radially inwardly extending projection, preferably circumferentially extending and engaging behind the end of the threaded bushing facing the machine part, especially in the form of a circumferential collar at the cylinder or at the piston or a circumferential, radially inwardly projecting conical surface at the cylinder or the piston whereby in this case a corresponding conical surface is provided at the end of the threaded bushing which is engaged from behind by the conical surface at the cylinder or the piston.

Also, the safety catch can advantageously be comprised of at least one pin extending through transverse bores of the cylinder and engaging behind the end of the threaded bushing or the projection at the nut.

Preferably, two parallel pins can be inserted through transverse bores on opposite sides of the threaded bolt and advantageously form the two legs of a U-shaped bracket. The pins can be arranged such that they engage an annular groove at the nut or the end of the threaded bushing can be conically shaped so that the pin or pins, upon breakage of the threaded bushing, come to rest at the conical surface. Optionally, the pin or pins can be provided with a corresponding flattened portion.

The safety catch may also be comprised of at least one radially inwardly extending projecting at the cylinder that engages behind a projection at a washer positioned beneath the nut. In this context it is advantageous when two diametrically oppositely arranged projections with interposed cutouts at the washer cooperate with two corresponding projections at the cylinder in the manner of a bayonet closure. In this case, the contacting surfaces of the projections can be embodied as conical surfaces.

Furthermore, the safety catch can be comprised of at least one annular segment with a projection engaging an annular groove at the cylinder and a projection engaging an annular groove at the washer. Preferably, the nut and the cylinder can both be supported on the washer and two ring segments, connected to one another by a hinge, can surround the cylinder and the washer.

BRIEF DESCRIPTION OF THE DRAWINGS

The invention will be explained in detail in the following with the aid of the inventive embodiments represented in the drawing. It is shown in the drawing in.

DESCRIPTION OF PREFERRED EMBODIMENTS

Figure 1:
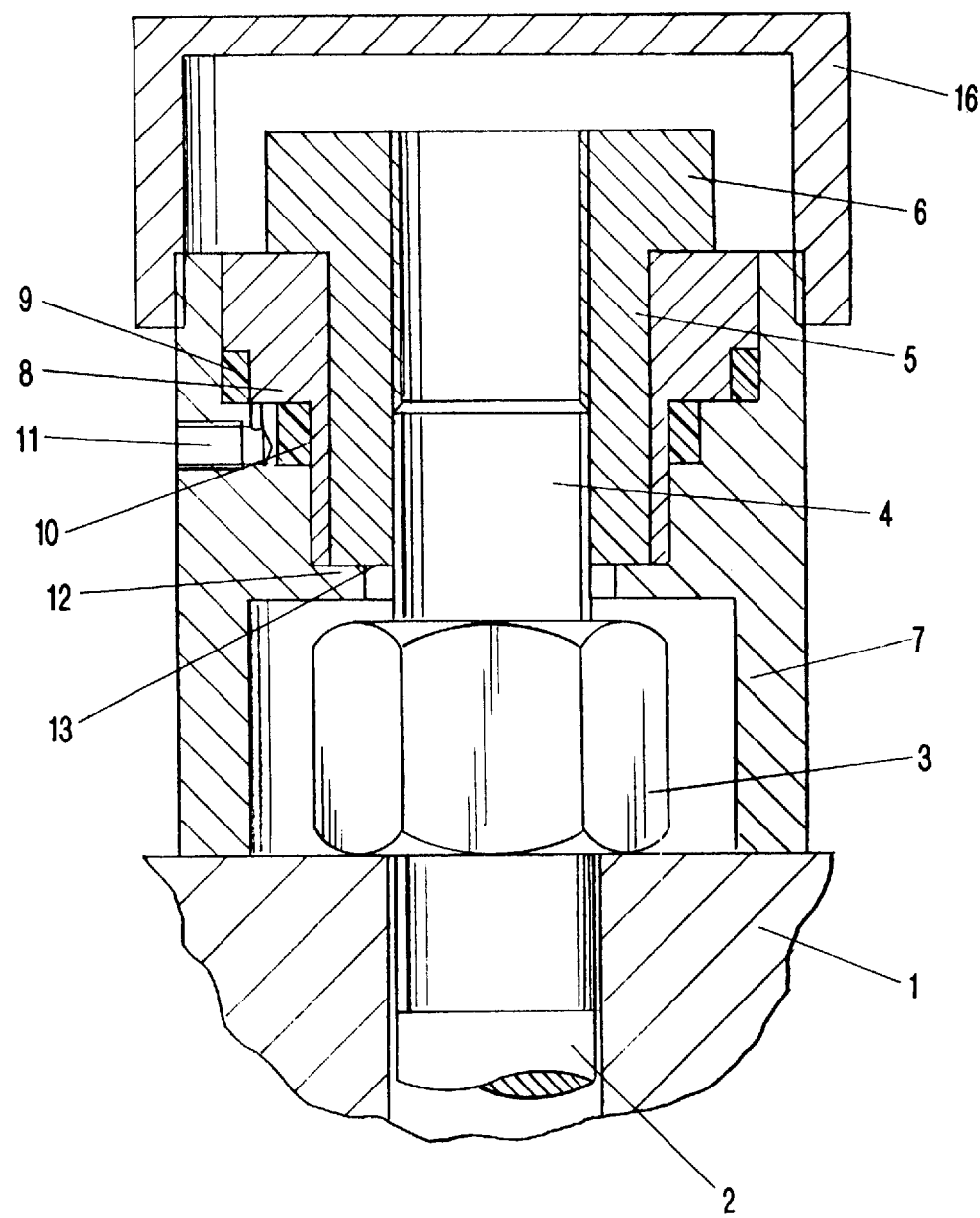
FIG. 1 a hydraulic tensioning device for threaded bolts with a collar engaging behind the threaded bushing, FIG. 2 a hydraulic tensioning device for threaded bolts with a conical surface at the cylinder or the piston engaging behind a conical surface at the threaded bushing, FIG. 3 a hydraulic tensioning device for threaded bolts with pins engaging behind the threaded bushing, FIG. 4 a hydraulic tensioning device for threaded bolts with pins engaging behind a projection provided by an annular groove in the nut, FIG. 5 a hydraulic tensioning device for threaded bolts with projections at the cylinder engaging under a washer below the nut, FIG. 6 a plan view in section along the line VI—VI of FIG. 5, FIG. 7 a hydraulic tensioning device for threaded bolts with ring segments surrounding the cylinder and a washer and FIG. 8 a plan view in section along the line VIII—VIII of FIG. 7.

A machine part 1 which may be, for example, a flange of a machine housing, is to be clamped with a threaded bolt 2 and a nut 3 threaded thereon. In order to apply onto the threaded bolt 2 an exactly controllable pretension and in order to avoid torsional moments at the threaded bolt 2, which would cause an additional loading of the threaded bolt 2, the nut 3 is first manually threaded onto the threaded bolt 2 until it abuts the machine part 1. The length of the threaded bolt 2 is selected such that a free threaded end 4 projects past the nut 3.

The tensioning device for threaded bolts is comprised of a cylinder 7 with a piston 8 sealingly guided therein with seals 9, 10, whereby the piston 8 engages below a collar 6 of a threaded bushing 5. This threaded bushing 5 is threaded onto the free threaded end 4 until the cylinder 7 comes to rest at the machine part 1. Onto the opposite end of the cylinder 7, a cap 16 is threaded.

When the cylinder space between the cylinder 7 and the piston 8 is loaded with hydraulic oil via the pressure oil channel 11, the threaded bolt 2 is subjected to an elongation force which is applied by the axial movement of the piston 8 via the collar 6 onto the threaded bushing 5 and from there onto the free threaded end 4. The required elongation can be predetermined and, for example, can be measured by the distance between the upper end of the threaded bushing 5 and the cap 16. When the required elongation has been reached, the nut 3 is turned in direction toward the machine part 1. This can be achieved in that a pin is inserted into a non-represented opening within the cylinder 7 with which the nut 3 can be turned. It is also possible to position a ring with a hexagon socket and an outer toothing onto the nut 3 in the intermediate space between the cylinder 7 and the nut 3 whereby a gear wheel engages from the exterior through the opening within the cylinder 7 so that the nut 3 can be turned. The cylinder 7 comprises a radially inwardly extending collar 12 in the area of the end of the threaded bushing 5 facing the nut 3 which engages behind the end 13 of the bushing.

When due to fatigue the threaded bushing 5 breaks in the area of the end of the projecting free threaded end 4, the threaded bushing 5 as well as possibly the piston 8 would be thrown against the inner side of the cap 16 and, due to the great impact, would also throw off the cylinder 7 if these elements were not prevented from doing so by the collar 12 which engages behind the part of the threaded bushing 5 remaining on the free threaded end 4.

Due to this collar 12 in connection with the remaining part of the threaded bushing 5 on the free threaded end 4, a throwing off of the broken parts of the threaded bushing 5, the piston 8, and the cylinder 7 is thus securely prevented.

Figure 2:
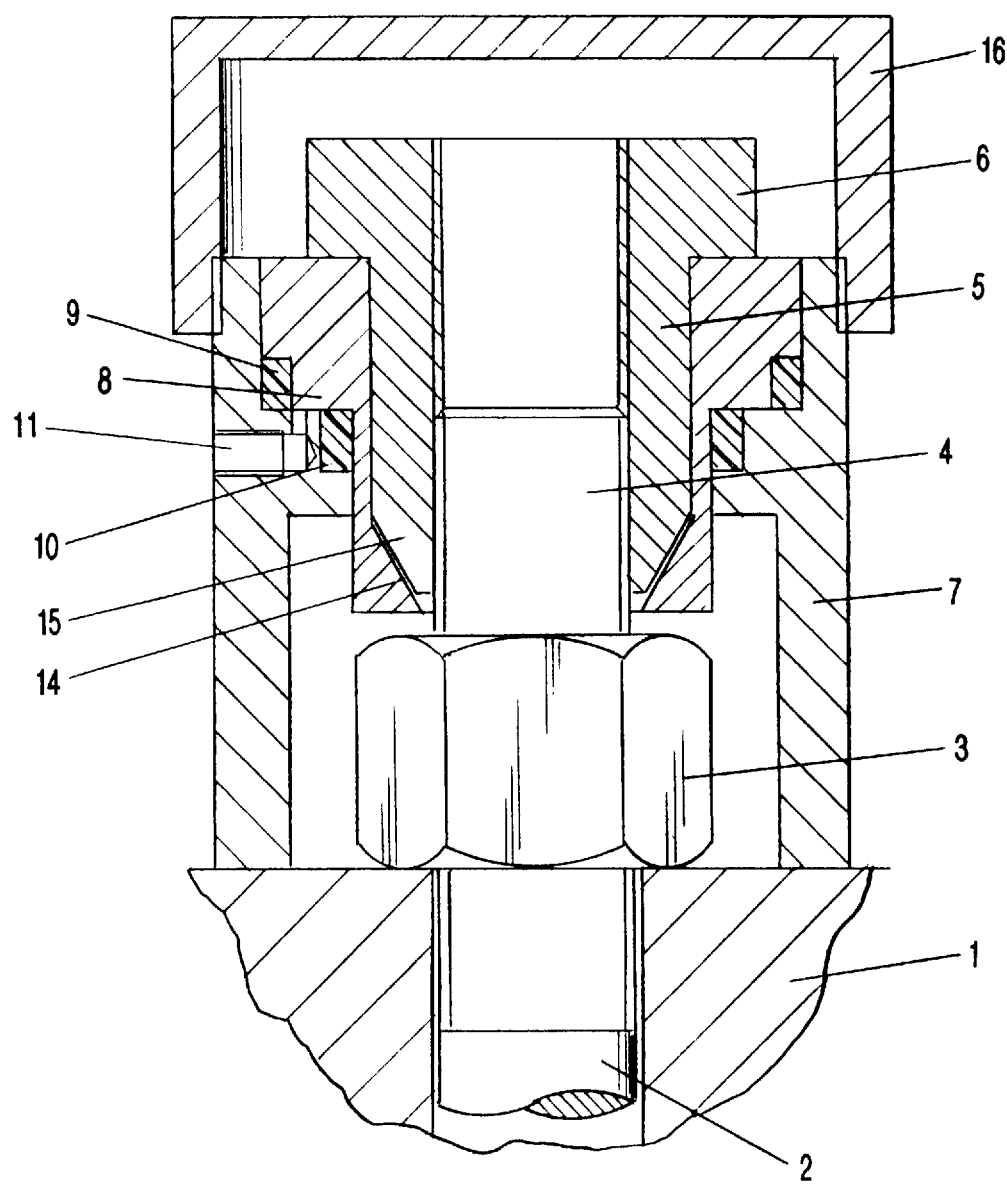

In the embodiment according to FIG. 2, the piston is provided with a radially inwardly extending conical surface 14 which engages behind a corresponding conical surface 15 at the end of the threaded bushing 5. In this case, the torn-off part of the threaded bushing 5 and of the piston 8 are already caught when the conical surface 14 at the piston 8 comes to rest at the conical surface 15 at the end of the threaded bushing 5. In this embodiment, due to friction at the conical surfaces 14, 15 as well as due to an elastic and/or plastic expansion of the piston area at the conical surface 14, energy is consumed resulting in a considerable impact damping. Optionally, the exterior surface of the piston area at the conical surface 14 can also be of a conical design in order to achieve a controlled widening and easy removal of the piston after deformation.

Of course, the cylinder 7 can be provided with, instead of the collar 12, as represented in FIG. 1, in an analogous manner with a radially inwardly projecting conical surface, as represented in FIG. 2 for piston 8, and, vice versa, the piston 8, instead of being provided with the conical surface 14 represented in FIG. 2, can have a radially inwardly extending collar as represented in FIG. 1 at the cylinder 7 without deviating from the inventive principle.

Figure 3:
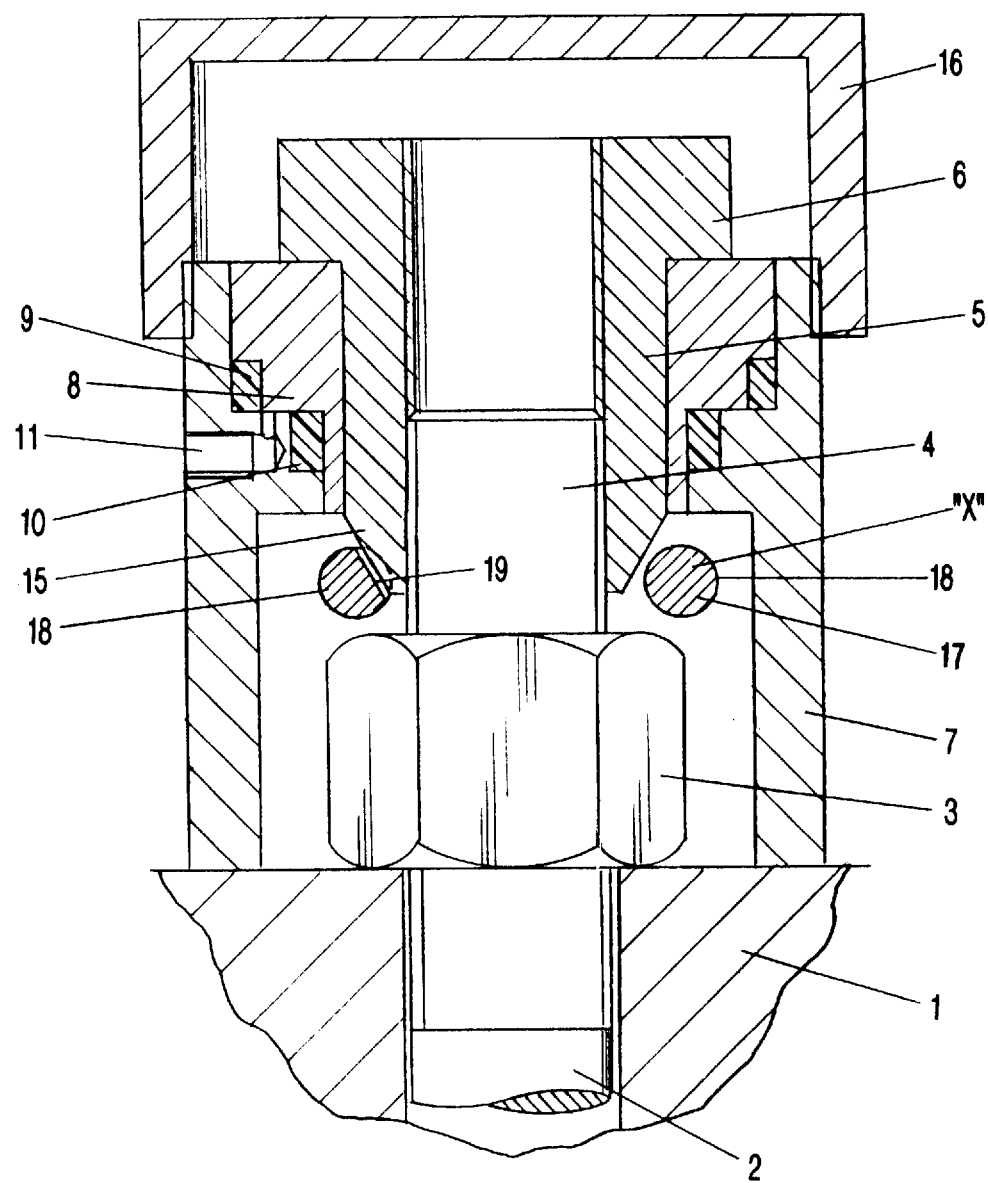

The embodiment represented in FIG. 3 comprises a conical surface 15 at the threaded bushing 5. In the area between the nut 3 and the end of the threaded bushing 5 parallel pins 17 are positioned which are inserted through parallel bores 18 within the cylinder 7. External to the cylinder 18 the pins 17 may be connected by a stay so that they form the legs of the U-shaped bracket. The pins 17, as represented in the right half of FIG. 3, can be circular or, as shown on the left half of FIG. 3, may have a flattened portion 19 in order to provide for better contacting at the conical surface 15 of the threaded bushing 5 when the threaded bushing 5 will break in the area of the end of the projecting threaded end 4.

Figure 4:
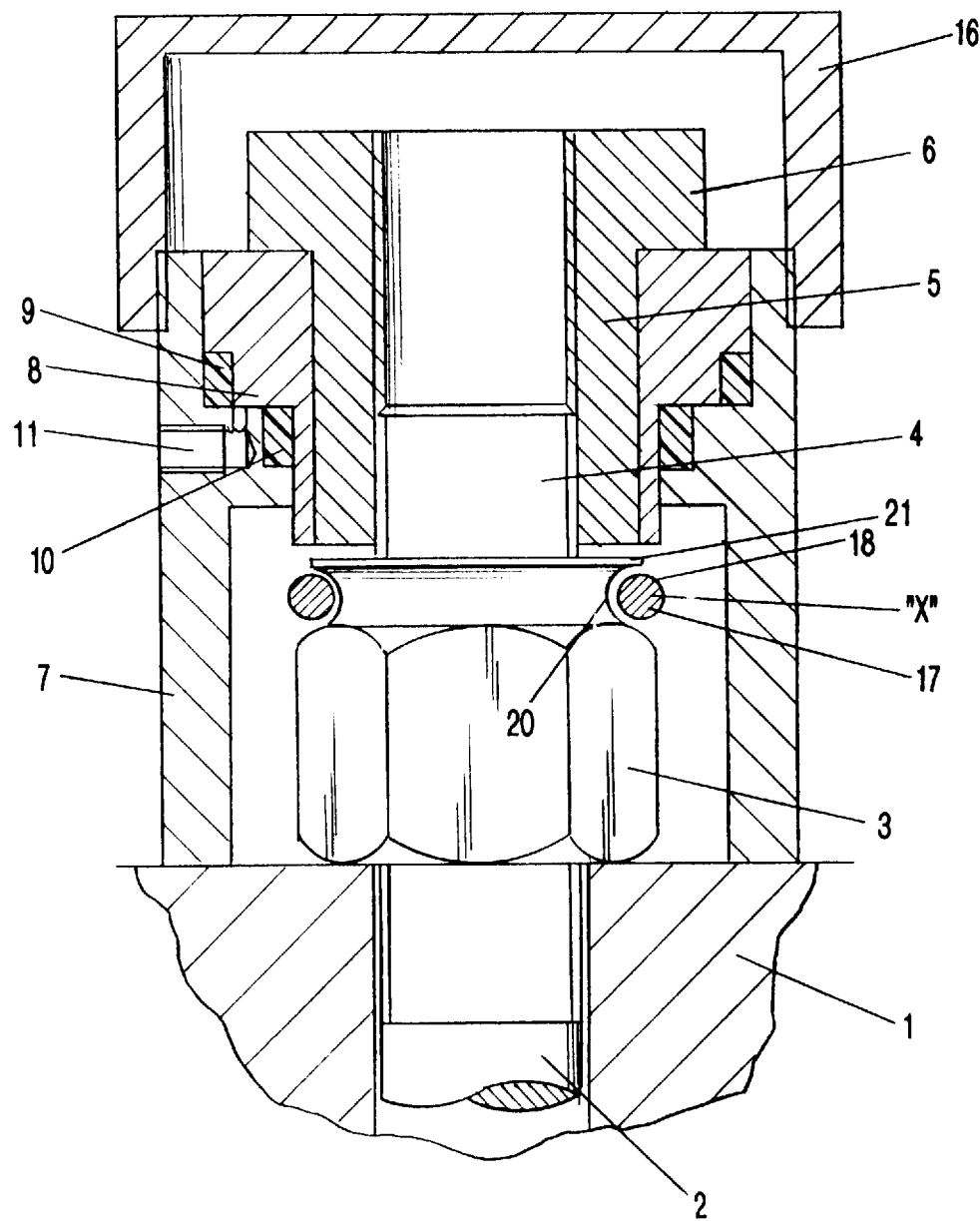

In the embodiment represented in FIG. 4 parallel pins 17 are inserted through bores 18 in the cylinder 17. In this case the pins 17 are arranged in the area of the nut 3, in particular in the area of the annular groove 20 which provides a circumferential projection 21 which prevents that upon breaking of the threaded bushing 5 the piston 8 together with the torn-off part of the threaded bushing 5 and the cylinder 7 will be thrown off.

Figure 5:
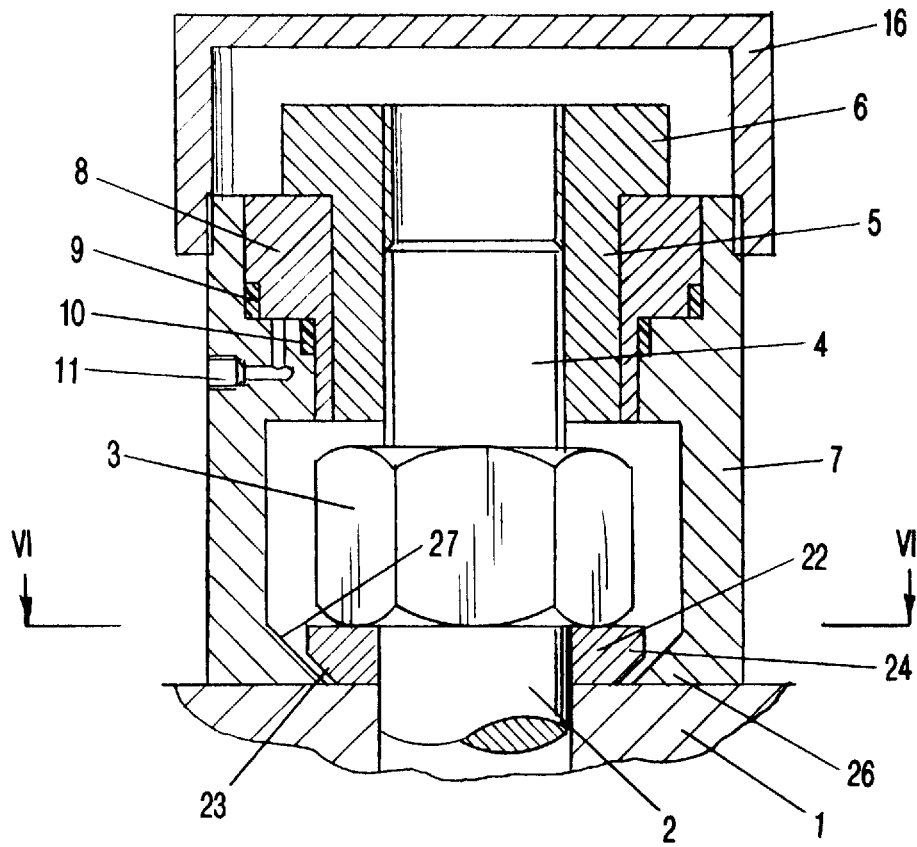
Figure 6:
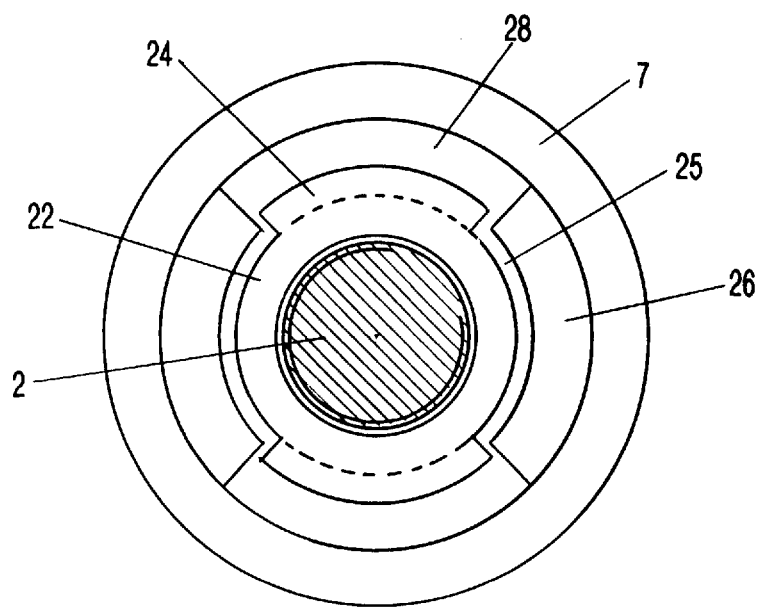

In the embodiment represented in FIG. 5 a washer 22 is arranged underneath the nut 3 and has at its underside a conical surface 23. The thus resulting circumferential projection is interrupted by cutouts 25 so that two diametrically oppositely arranged projections 24 result which extend over an angular peripheral range of 90° of the washer 22. Corresponding projections 26 are arranged at the bottom of the cylinder 7 and are also interrupted by cutouts 28. The thus designed two diametrically oppositely arranged projections 26 are provided with corresponding conical surfaces 27. The projections 24 and the cutouts 25 at the washer 22 cooperate with the projections 26 and the cutouts 28 at the cylinder 3 in the manner of a bayonet closure so that the cylinder 7 in the position represented in FIG. 6 can be positioned on top of the washer 22 and can be locked by turning by 90°. In this non-represented position the projections 26, which engage behind the projections 27, serve as a safety catch for the hydraulic tensioning device for threaded bolts if the threaded bushing 5 should break.

Figure 7:
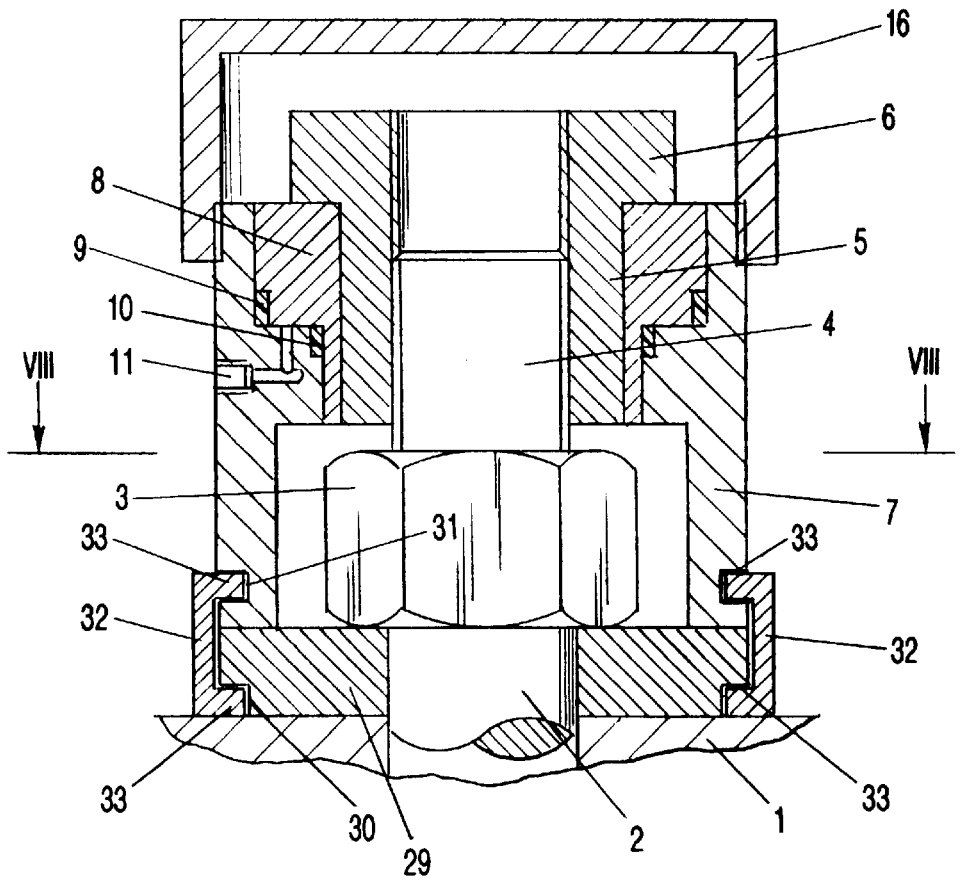
Figure 8:
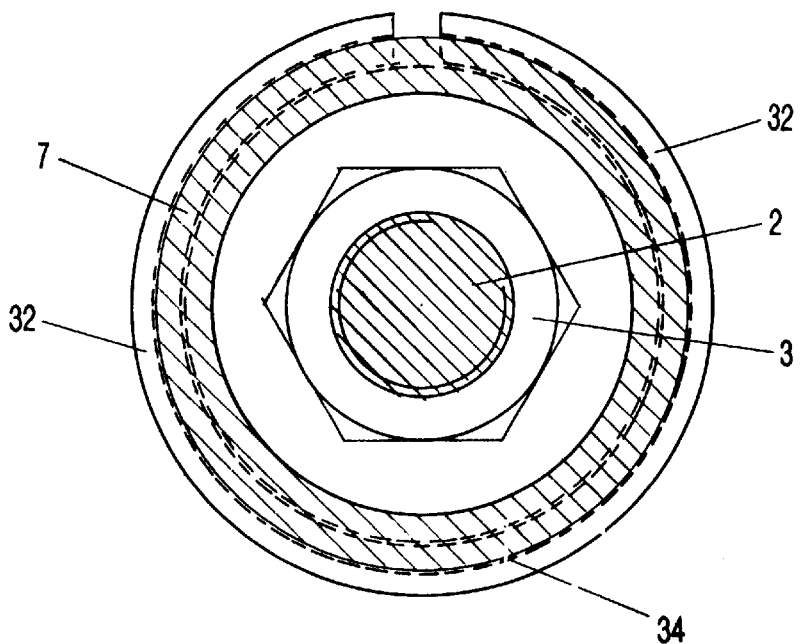

In the embodiment according to FIG. 7 a washer 29 is provided having an outer diameter corresponding to the outer diameter of the cylinder 7. The washer 29 and the cylinder 7 each have a circumferential annular groove 30 and 31.

Two ring segments 32 with radial projections 33, which are connected with a hinge 34, can be placed about the washer 29 and the cylinder 7 after positioning the hydraulic tensioning device for threaded bolts so that the radial projections 33 engage the annular grooves 30, 31. In this manner, the ring segments 32 serve as a safety catch for the hydraulic tensioning device for threaded bolts in the case that the threaded bushing 5 will break.

The details of the hydraulic tensioning device for threaded bolts are only represented schematically because they are well known in the art. However, special mention should be made of the fact that, if high forces are required, a plurality of pistons can be axially arranged one after another whereby one or more can be supplied with hydraulic oil in order to achieve an adaptation of the required forces.

The present invention is, of course, in no way restricted to the specific disclosure of the specification and drawings, but also encompasses any modifications within the scope of the appended claims.

We claim:

1. A hydraulic tensioning device for a threaded bolt, said tensioning device comprising:

a cylinder resting on a machine part to be clamped with a threaded bolt and a nut;

a threaded bushing threaded onto a free end of the threaded bolt; a piston, positioned radially inwardly in said cylinder and radially outwardly on said threaded bushing;

said piston guided sealingly in said cylinder and resting on said threaded bushing;

a safety catch connected to said cylinder and engaging one of said nut and said threaded bushing;

said safety catch preventing throwing off broken parts of said threaded bushing as well as preventing throwing off said cylinder and said piston upon breaking of said threaded bushing.

2. A hydraulic tensioning device according to claim 1, wherein:
said safety catch is at least one radially inwardly extending projection;
said threaded bushing has an end face facing the machine part; and
said projection engages said end face of said threaded bushing.

3. A hydraulic tensioning device according to claim 2, wherein said projection is a first circumferential conical surface and wherein said end face has a second circumferential conical surface matching said first circumferential conical surface.

4. A hydraulic tensioning device according to claim 2, wherein said projection is a radial collar.

5. A hydraulic tensioning device according to claim 1, wherein said cylinder has at least one transverse bore and wherein said safety catch is comprised of at least one pin received in said at least one transverse bore.

6. A hydraulic tensioning device according to claim 5, wherein said at least one pin engages an end face of said threaded bushing facing the machine part.

7. A hydraulic tensioning device according to claim 6, wherein said end face comprises a conical surface and wherein said at least one pin has a flattened surface matching said conical surface.

8. A hydraulic tensioning device according to claim 5, wherein said nut has a catch projection and said at least one pin engages said catch projection.

9. A hydraulic tensioning device according to claim 8, wherein said catch projection is an annular groove.

10. A hydraulic tensioning device according to claim 5, wherein said cylinder has two of said transverse bores and two of said pins, wherein said pins extend parallel to one another on opposite sides of the threaded bolt.

11. A hydraulic tensioning device according to claim 10, wherein said safety catch comprises a connecting bar connecting said two pins to a U-shaped bracket.

12. A hydraulic tensioning device according to claim 1, wherein:
said safety catch is at least one radially inwardly extending projection;
said nut includes a washer resting on the machine part and having at least one catch projection; and
said at least one radially inwardly extending projection engaging said catch projection.

13. A hydraulic tensioning device according to claim 12, wherein two of said radially inwardly extending projections and two of said catch projection are provided and wherein said radially inwardly extending projections and said catch projections form a bayonet closure.

14. A hydraulic tensioning device according to claim 12, wherein said at least one radially inwardly extending projection and said at least one catch projection have conical contact surfaces for engaging one another.

15. A hydraulic tensioning device according to claim 1, wherein said safety catch is at least one annular segment having two radially extending projections, wherein said cylinder has a first annular groove engaged by a first one of said radially inwardly extending projections and wherein said nut includes a washer resting on the machine part and having a second annular groove engaged by a second on of said radially inwardly extending projections.

16. A hydraulic tensioning device according to claim 15, wherein said cylinder rests on said washer and wherein two of said ring segments are connected by a hinge and surround said cylinder and said washer.

17. A hydraulic tensioning device for a threaded bolt, said tensioning device comprising:
a cylinder resting on a machine part to be clamped with a threaded bolt and a nut;
a threaded bushing threaded onto a free end of the threaded bolt;
a piston, positioned radially inwardly in said cylinder and radially outwardly on said threaded bushing;
said piston guided sealingly in said cylinder and resting on said threaded bushing;
a safety catch connected to said piston and engaging said threaded bushing;
said safety catch preventing throwing off broken parts of said threaded bushing as well as preventing throwing off said piston upon breaking of said threaded bushing.

18. A hydraulic tensioning device according to claim 17, wherein:
said safety catch is at least one radially inwardly extending projection;
said threaded bushing has an end face facing the machine part; and
said projection engages said end face of said threaded bushing.

19. A hydraulic tensioning device according to claim 18, wherein said projection is a first circumferential conical surface and wherein said end face has a second circumferential conical surface matching said first circumferential conical surface.

20. A hydraulic tensioning device according to claim 18, wherein said projection is a radial collar.

* * * * *